United States Patent [19]

Geerts

[11] Patent Number: 4,763,771
[45] Date of Patent: Aug. 16, 1988

[54] CONVEYOR INSTALLATION

[76] Inventor: Johannes G. C. Geerts, Zandvoorterweg 3, 2111 GN Aerdenhout, Netherlands

[21] Appl. No.: 16,096
[22] Filed: Feb. 18, 1987

[30] Foreign Application Priority Data

Feb. 20, 1986 [NL] Netherlands ............ 8600433

[51] Int. Cl.⁴ .................................. B65G 47/46
[52] U.S. Cl. ........................... 198/365; 198/370; 198/574
[58] Field of Search ......... 198/365, 370, 372, 574, 198/482.1, 802; 209/651–654, 698; 414/349, 352, 353, 373, 384, 387, 390

[56] References Cited

U.S. PATENT DOCUMENTS

| | | | |
|---|---|---|---|
| 3,463,298 | 8/1969 | Harrison | 198/365 |
| 3,550,748 | 12/1970 | Hauer | 198/365 |
| 3,616,895 | 11/1971 | Lo Presti et al. | 198/365 X |
| 4,004,681 | 1/1977 | Clewett et al. | 198/365 |
| 4,102,448 | 7/1978 | Wolbrink et al. | 198/365 |
| 4,378,062 | 3/1983 | Macrum | 198/365 |
| 4,565,277 | 1/1986 | Benier | 198/365 |

Primary Examiner—Robert J. Spar
Assistant Examiner—D. Glenn Dayoan
Attorney, Agent, or Firm—Lalos & Keegan

[57] ABSTRACT

Conveyor installation or sorting machine for throwing off objects into one of a number of delivery stations, comprising trolleys (2) moving along a trajectory. Each trolley consists of a forward travelling frame part (8) and a vertically displaceable frame part (9), the latter part comprising an endless belt (7) running over pulleys (6), one of the pulleys being driven by power accumulated into the vertically displaceable frame part (9) in a portion (39') of the trajectory preceding the delivery stations, for throwing off the object in a direction perpendicular to the direction of travel of the trolley.

7 Claims, 3 Drawing Sheets

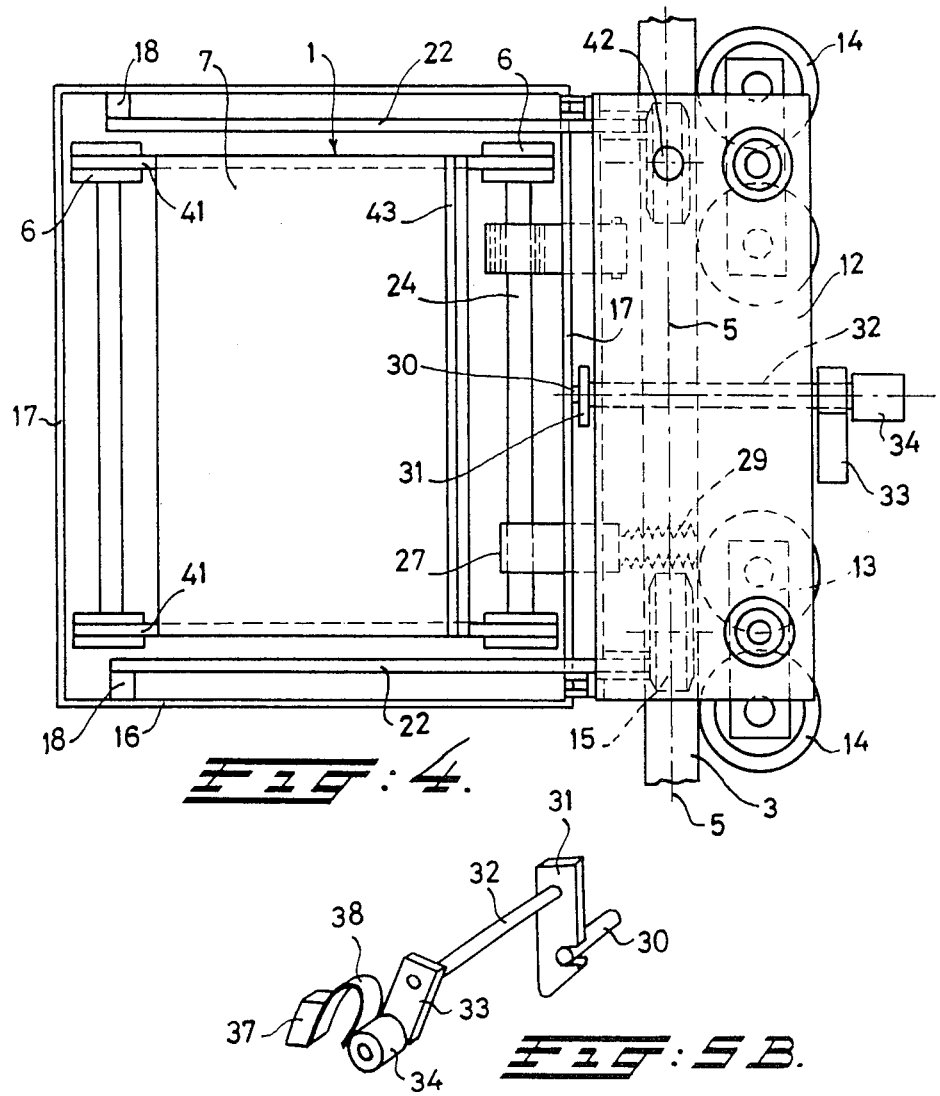
FIG:4.
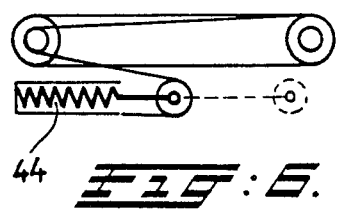
FIG:5B.
FIG:6.

CONVEYOR INSTALLATION

BACKGROUND OF THE INVENTION

The invention concerns a conveyor installation comprising at least one frame or trolley travelling along a trajectory and fitted with a load carrier for the load to be delivered into one of a series of delivery stations, further comprising means to throw off the load at a predetermined station. Such an installation is known in several variations and is often used for sorting objects which are thrown off the load carrier at the correct spot into a collecting station along the path of the conveyor. Provision is made, mostly controlled by a computer for selective throwing off so that the objects concerned (the load) arrive at the correct station.

The known conveyor installations have the load carrier in the form of a split bin, that is to say that the bottom of the bin (the actual load carrier) opens downwards in two halves so that the load is allowed to drop into the correct station.

SUMMARY OF THE INVENTION

The invention intends to provide an installation such that it is possible to throw off the load into a colleting station alongside the path of the conveyor rather than underneath it, without using a special motor for this purpose. The object is achieved according to the invention by constructing the load carrier out of a belt passing over at least two pulleys. The belt is subjected to a sideways displacement perpendicular to the trajectory in order to throw off the load and means are provided for driving at least one of the pulleys with power accumulated whilst traversing a part of the trajectory, preceding the collecting stations.

Through these features the belt is moved by the drive means at the chosen moment so that the load situated on it is moved in a sideways direction. The drive means can consist of, for example a spring which is previously tensioned using the forwards movement of the trolley or frame concerned. It is also possible to move the belt by means of a weight that moves downwards on a cable and drives one of the pulleys. After the load has been thrown off, the weight can be moved up again using the forward movement of the movable trolley. Finally it can be noted that it is in principle possible to throw off the load on either side by selecting the correct direction of movement at the same time as the drive means are activated.

In particular the invention concerns a conveyor installation of the type described above whereby the throwing off of the load occurs by reason of gravity after a catch is released. In this type of installation however the throwing off of the load occurs downwards and the invention intends to accomplish this in a sideway direction. In order to achieve this the conveyor installation according to this invention is distinct in that at least a part of the frame together with the pulleys is suspended in the travelling frame part in a manner to be vertically displaceable i.e. up- and downward movable and after the catch is released can undergo a controlled free fall, the power necessary for driving at least one of the pulleys being obtained by the free fall movement of the displaceable frame part with respect to the forward travelling frame part.

Seeing that the displaceable frame part also carries the load, sufficient power is generated to throw off this load sideways at an appreciable speed. In a further portion of the trajectory the displaceable frame part can be moved back upwards and the catch reset ready for receiving a new load and depositing this at the correct spot.

A simple constructional solution for converting the downwards movement of the displaceable frame part into sideways movement of the belt is obtained according to the invention by mounting at least one of the pulleys on a rotatable axle upon which a cable is wound, the free end of which is attached to the forward travelling frame part in such a way that during the downward movement of the displaceable frame part the cable wound around the axle unwinds turning the pulley concerned and thus driving the belt so as to throw off the load sideways.

It is sometimes useful to use the same surface part of the belt for collecting and throwing off the load especially when special dogs or pushing members are used on the belt. In that case it is favourable according to the invention to wind a second cable on the axle of the drive pulley in the opposite way to the first cable. The free end of this second cable is attached via a spring mechanism to the forward travelling frame part. This arrangement ensures that both cables remain in tension and that after throwing off its load the belt comes back precisely to its original position.

It is possible to join the vertically displaceable frame part to the forward travelling frame part via a slide guide. This has however the object that friction is caused, in particular as a result of the cantilever loadbearing construction that causes a permanent tilting couple in the frame (the trolley).

According to a further aspect of the invention the vertically displaceable frame part is suspended by means of two quadrangular linkages each consisting by two pivots upon the forward travelling frame part and by two pivots upon the displaceable frame part, said pivots being connected pairwise by along and mainly horizonatlly extending arm and by a short inclined arm respectively, said quadrangular linkages composed by these arms lying on either side of the displaceable frame part. This allows the displaceable frame part bearing the catch to be moved in such a way that at the end of the upwards movement a quaranteed resetting of the catch is effected.

As a result of using a linkage to support the load carrier there is an inevitable loss of stiffness in the construction, which can be noticed when heavier loads are applied. According to the invention the stiffness can be markedly increased in a very simple manner by combining the short amrs of both quadrangular linkages into a plate which has a common hinge axis for the pivots concerned on two of its sides. The increased stiffness is particularly noticeable in the direction parallel to the travel of the trolley along the trajectory.

It has already been mentioned that it can be favourable to always use the same part of the belt for receiving and throwing off the load. In that case the invention proposes to make the length and width of the belt the same as the dimensions of the load carrier and to connect the ends of several narrow betls to each end of the load belt in order to tension it and to cooperate with the driven pulleys. In this way the belt can be designed entirely for its function of receiving and throwing off the load, whilst the necessary sideways driving force for throwing off the load is created by the cooperation of the narrow belts and the pulleys.

SURVEY OF THE DRAWINGS

The invention will be explained in more detail using the drawings which show one embodiment and a few variations of the conveyor installation according to the invention.

FIG. 4 is a top view of the load carrier of each forward-moving frame as indicated by the arrow IV in FIG. 2.

FIG. 5b is a detail from FIG. 5A.

FIG. 6 shows a variation of a detail from the previous figures.

DESCRIPTION OF THE PREFERRED EMBODIMENTS

Figures 1, 2:
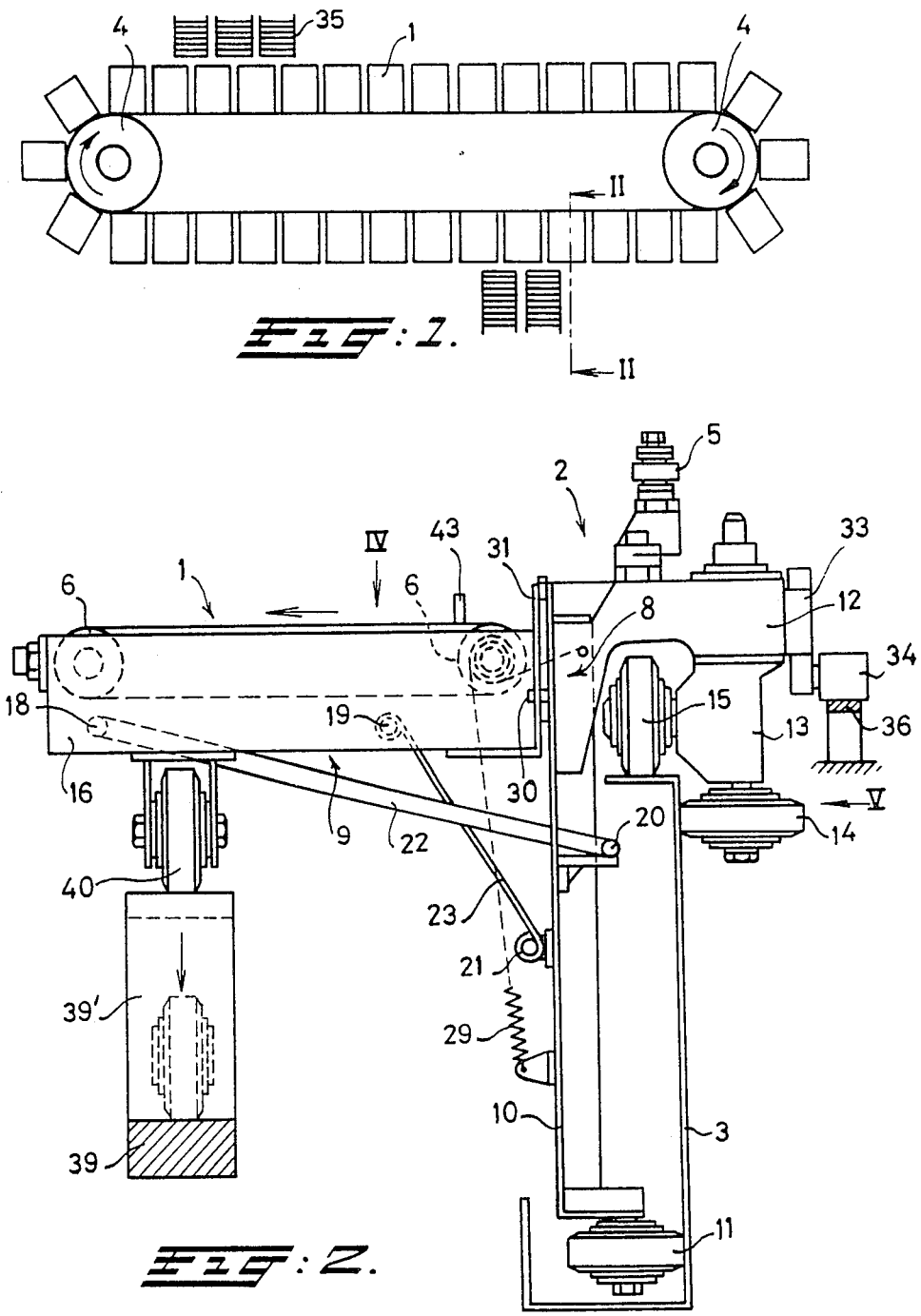
FIG. 1 is a very schematic top view of a complete conveyor and sorting installation.
FIG. 2 is a cross-section on a much larger scale along the line II—II in FIG. 1.

THe top view according to FIG. 1 shows a construction of a conveyor-sorter installation consisting of a number of load carriers 1 for a load to be delivered. Each load carrier 1 is supported in a frame or trolley 2 (see FIG. 2) which travels along a trajectory formed by a fixed profile beam 3. This trajectory is shown here as elongated and has two turning points 4. The trolleys 2 are coupled together by an endless belt or chain 5 mostly driven (not shown) at one of the turning points 4. The described installation is conventional up to this point.

Figure 5A:
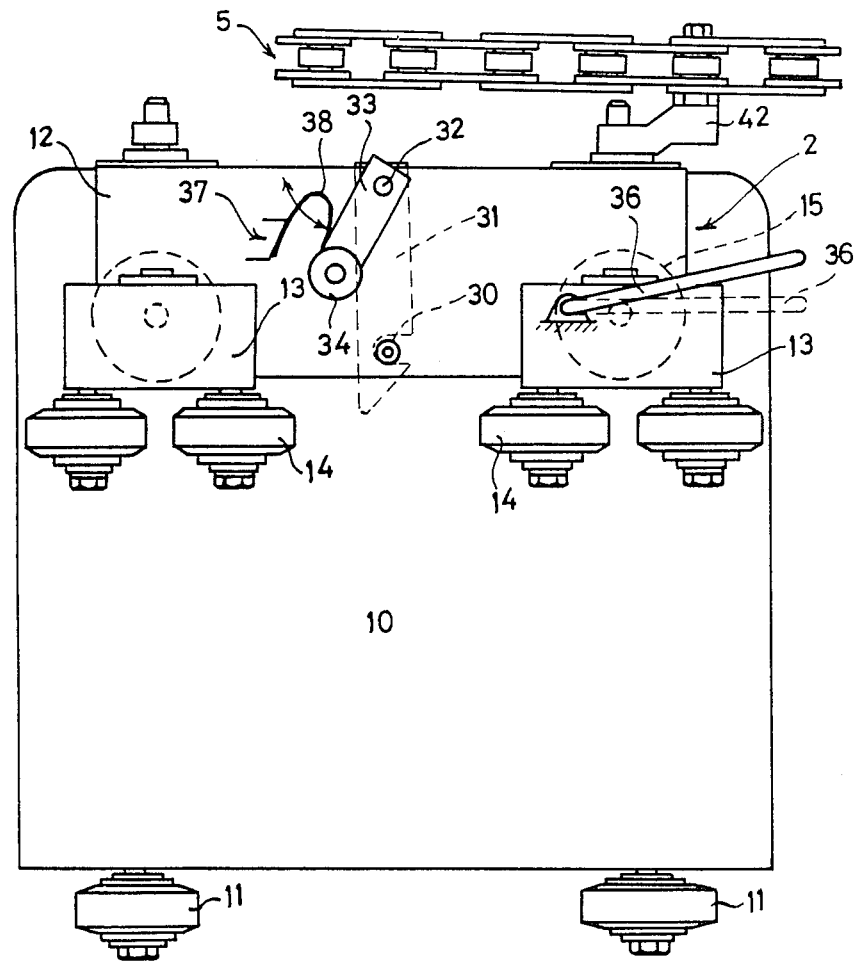
FIG. 5A is a rear view of the forward travelling frame as indicated by the arrow V in FIG. 2
Figure 3:
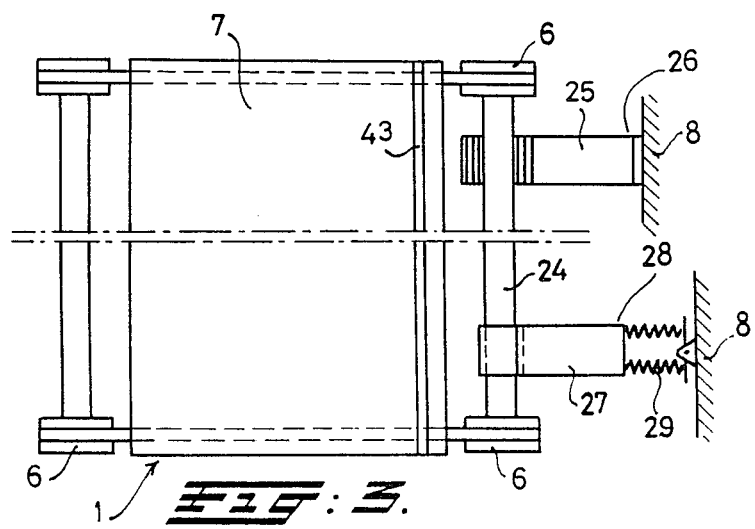
FIG. 3 shows details from FIG. 2 of the drive mechanism of the belt on a more enlarged scale.

As can be seen in FIGS. 2 and 3 the load carrier 1 is formed by a belt 7 round two pulleys 6. The pulleys 6 are rotatable as will be described later, so that the belt 7 can be moved in a direction perpendicular to that of the trajectory (the profile beam 3). Seeing that the load to be transported and sorted is on this belt 7, the load can thus be thrown off sideways. The power required for driving the belt 7 is obtained by splitting the frame or trolley 2 into a forward-travelling part 8 and a vertically-displaceable part 9. Part 8 is made up from a plate 10 which is fitted on the top side with a bearing and guiding construction 12-15, to cooperate with the profile beam 3 and which will be desribed later, whilst two support rollers 11 contacting the inner side of the profile beam 3 are mounted on the under side. The bearing and guiding construction just mentioned consists of an elongated block 12 (see FIG. 5 also) with on either side of the middle two rotatable swing pieces 13 are mounted. Two rotatable guide rollers 14 are mounted in each swing piece 13. These guide rollers are in contact with the outside of the profile beam 3. Block 12 is fitted further with two rollers 15 which rest on the top side of the profile beam 3 and bear the whole weight of the trolley 2. That describes the forward travelling frame part 8.

The vertically-displaceable part 9 consists of two side plates 16 (see FIG. 4 also) which are connected to each other by two strips 17. These elements 16 and 17 form substantially the vertically displaceable part 9 that is hung on two quadrangular linkages. For these two pivots 18 and 19 are mounted on both side plates 16 whilst two pivots 20 and 21 are mounted on plate 10 of the forward-travelling frame part 8. Pivots 18 and 20 are jointed in pairs by a long, almost horizontal arm 22. Pivots 19 and 21 are joined to each other by a plate 23 which has a common axis for both pivots 19 on the one side and on the other a common axis for both pivots 21. This supporting construction for the vertically displaceable frame part 9 allows the part to move up and down a restricted distance whilst remaining largely horizontal.

The load carrier 1 formed by the belt 7 that is mounted over two pulleys 6 is situated above the side plates 16. The two pulleys 6 shown on the right of FIG. 3 are fixed on an axle 24 which is provided with means to drive the pulleys. These means consist of a first cable 25 which is wound round axle 24 and connected with its free end to the forward-travelling frame part 8. A second cable 27 is also wound around axle 24 of the driving pulleys but in the opposite sense to cable 25. The free end 28 of this second cable 27 is also connected to the forward-travelling frame part 8 via a spring member 29. It will be clear that during a downward movement of part 9 the one cable 25 wound around axle 24 is unrolled whilst the other cable 27 is rolled up so that the drive pulleys 6 turn and the belt 7 is driven so as to throw off the load sideways. During upward movement of the frame part 9 the cable 25 is rolled up and cable 27 unrolls so that axle 24 turns in the opposite direction thus moving the load belt 7 back to its original position.

The displaceable part 9 is fitted with a projecting pin 30 (see FIG. 2 and 4) which together with a locking catch 31 can hold this part in its highest position. The catch 31 is mounted on the end of an axle 32 which is borne in block 12. The other end of axle 32 is fitted to a lever arm 33 connected to a roller 34. Each trolley 2 is fitted with a similar mechanism 31-34 so that a controlled free fall movement of the displaceable frame part 9 relative to the forward-travelling frame part 8 is made possible.

A number of receiving stations 35 (see FIG. 1), for example designed as a roller course, in which the thrown off loads must land are placed on the outside of the trajectory along which the trolleys 2 travel. Near each receiving station 35 a tiltable cam is mounted upon the fixed frame of the profile beam 3. This cam is normally lying horizontally as shown dotted in FIG. 5, so that no contact is made with the roller 34. By means of an electromagnet (not shown) the cam 36 can be moved to the sloping position shown. The necessary signal for this is given by the computer system used or in some other way. The first arriving trolley 2 that passes the sloping cam 36 receives an impulse because roller 34 comes in contact with cam 36. Thus axle 32 with the catch 31 is turned so that pin 30 is freed and the part 9 can move downwards under the force of gravity. Lever arm 33 can only be turned through a limited angle because of the restriction 37, whilst a spring 38 exerts pressure on arm 33 for two purposes. In the first place arm 33 and hereby axle 32 with catch 31 are forced back into the position shown in FIG. 5b, whilst the cam 36 is also forced back from the sloping to the horizontal position.

When pin 30 has been freed the displaceable frame part 9 moves downwards and is guided here by arms 22 and plate 23 of the rectangular linkages. The downwards movement of part 9 is limited by the presence of a rail 39 extending parallel to the profile beam 3 at a suitable distance beyond this beam. Part 9 is fitted with a wheel 40 underneath which ends up resting on rail 39. At a fixed point in the trajectory of the trolleys 2, for example near one of the turning points 4, the rail 39 is raised 39' so that any parts 9 which have fallen down are moved upwards again and pin 30 can be held by catch 31.

It should be noted that by using the long arms 22 and the short arms (the plate) 23, the free fall movement of part 9 is such that near the top of the falling movement pin 30 moves in the vertical plane through catch 31. In this way it is guaranteed that catch 31 will relock pin 30 during travelling along the highest part 39' of rail 39. At the beginning of the free fall the load carrier tilts slightly, which is favourable for throwing off the load quickly. This tilt is caused by using the long and short arms 22 and 23.

The length and width of the belt 7 are in agreement with the dimensions of the load carrier 1, with two narrow belts 41 being fixed onto both ends of this belt in order to tension it and to cooperate with the driven pulleys 6. During the free fall of part 9 belt 7 moves in a direction so as to throw off the load (in FIG. 3 to the left). When part 9 is moving upwards (by the rolling of wheel 40 on the raised poartion 39' of the rail 39) it moves in the opposite direction, this as a result of the working of the two oppositely wound cables 25 and 27. Finally it should be mentioned that each trolley 2 is transported by the endless chain 5 by means of a pivotal dog 42, linked to block 12, see FIG. 5A. There is also a projecting pick-up rib 43 fitted onto belt 7.

It follows from the above that according to the invention this conveyor installation makes it possible to throw off any load present on the load carrier 1 in a direction perpendicular to the trajectory followed by the trolleys. In order to achieve this use is made of at least a belt 7 moving over two pulleys 6 with a mechanism to drive at least one of the pulleys using the power created whilst a previous portion of the trajectory is traversed (the raised part 39').

What is claimed is:

1. A conveyor installation comprising at least one trolley travelling along a trajectory and comprising a forward travelling part and a vertically displaceable load carrier part for a load to be delivered into one of a series of delivery stations, further comprising means to throw off the load at a pre-determined station, the load carrier part being formed by at least a first belt passing over at least two pulleys, the belt being subjected to a sideways displacement perpendicular to the direction of travel along the trajectory in order to throw of the load, means for driving at least one of the pulleys with power accumulated in the vertically displaceable carrier part through upward vertical displacement of the carrier part during the traversal of the trolley through a section of the trajectory preceding the delivery stations whereby said power accumulated in said carrier part is provided to said means for driving at least one of said pulleys during a vertical free fall of said displaceable carrier part.

2. A conveyor installation according to claim 1 further comprising a catch mounted in said travelling part for releasably securing said vertically displaceable load carrier part to said travelling part, means for releasing said catch, and support means for permitting limited vertical displacement of said carrier part relative to said travelling part.

3. A conveyor installation according to claim 2 further comprising a rotatable axle for mounting at least one of said pulleys, and a first cable attched on one end to said axle and wound on said axle in a firsts direction, said first cable having a second end attached to said travelling part, whereby during said vertical free fall of said displaceable carrier part said first cable wound around said axle is unrolled so that said pulley mounted on said axle rotates to drive said belt to throw off said load sideways.

4. A conveyor installation according to claim 3 further comprising a second cable attached on one end to said axle and wound on said axle in a second direction opposite to said first direction of said first wound cable, said second cable having a second end attached to said travelling part by a spring member.

5. A conveyor installation accoding to claim 2 in which said support means for said vertically displaceable load carrier part includes two gradrangular linkages, each linkage formed by a first pivot on said travelling part joined to a second pivot on said carrier part by a long, substantially horizontal arm, and a third pivot on said travelling part joined to a fourth pivot on said carrier part by a short, sloping arm, one of said quadrangular linkages being located on a first side of said carrier part and a second one of said linkages being located on a second side of said carrier part opposite to said first side.

6. A conveyor installation according to claim 5 in which said short arms of both linkages comprise a single plate having a common hinge axis on each side of the carrier part for said third and fourth pivots.

7. A conveyor installation according to claim 1 in which said first belt has length and width dimensions substantially the same as the length and width dimensions of said load carrier part, and further comprising two narrow second belts, each of said narrow second belts being connected to said first belt to tension said first belt, said second belts being tensioned around a portion of the circumference of said pulleys.

* * * * *